United States Patent
Dalton et al.

(10) Patent No.: US 7,282,148 B2
(45) Date of Patent: Oct. 16, 2007

(54) POROUS SILICON COMPOSITE STRUCTURE AS LARGE FILTRATION ARRAY

(75) Inventors: Timothy Joseph Dalton, Ridgefield, CT (US); Michelle Leigh Steen, Danbury, CT (US)

(73) Assignee: International Business Machines Corporation, Armonk, NY (US)

( * ) Notice: Subject to any disclaimer, the term of this patent is extended or adjusted under 35 U.S.C. 154(b) by 316 days.

(21) Appl. No.: 10/697,077

(22) Filed: Oct. 30, 2003

(65) Prior Publication Data

US 2005/0092676 A1    May 5, 2005

(51) Int. Cl.
*B01D 39/00*    (2006.01)
*B01D 29/46*    (2006.01)
*B01D 53/22*    (2006.01)

(52) U.S. Cl. .................. 210/500.25; 210/490; 96/4; 96/6

(58) Field of Classification Search ........... 210/500.25, 210/500.26, 490, 500.27, 500.41; 427/244, 427/245; 96/4, 6, 10; 95/45; 264/60; 438/619, 438/637; 430/5, 296, 313, 314, 942; 428/64.4; 51/307; 528/480
See application file for complete search history.

(56) References Cited

U.S. PATENT DOCUMENTS

| | | | | |
|---|---|---|---|---|
| 4,701,366 A | | 10/1987 | Deckman et al. ............ 428/188 |
| 4,775,474 A | | 10/1988 | Chau et al. .................. 210/500 |
| 4,786,482 A | | 11/1988 | The et al. ..................... 423/130 |
| 4,873,037 A | | 10/1989 | Chau et al. .................... 264/49 |
| 4,894,516 A | * | 1/1990 | Ellis et al. .................... 392/344 |
| 4,941,893 A | * | 7/1990 | Hsieh et al. .................... 95/48 |
| 5,032,149 A | | 7/1991 | Hayes .............................. 55/16 |
| 5,100,555 A | | 3/1992 | Matson ........................ 210/651 |
| 5,114,581 A | * | 5/1992 | Goldsmith et al. .......... 210/650 |
| 5,190,654 A | | 3/1993 | Bauer .......................... 210/490 |
| 5,194,154 A | * | 3/1993 | Moyer et al. ............. 210/510.1 |
| 5,271,858 A | * | 12/1993 | Clough et al. ................. 252/74 |
| 5,464,798 A | * | 11/1995 | Jia et al. ........................ 502/64 |
| 5,492,623 A | | 2/1996 | Ishibe ......................... 210/232 |
| 5,534,149 A | * | 7/1996 | Birkenbeil et al. .......... 210/636 |
| 5,716,526 A | * | 2/1998 | Kelemen et al. ............ 210/650 |
| 5,772,735 A | * | 6/1998 | Sehgal et al. ................... 95/45 |
| 5,782,959 A | | 7/1998 | Yang et al. ...................... 96/11 |
| 5,789,024 A | * | 8/1998 | Levy et al. ................... 427/244 |
| 6,045,899 A | | 4/2000 | Wang et al. ................. 428/315 |
| 6,110,249 A | | 8/2000 | Medcalf et al. ............... 55/514 |
| 6,226,852 B1 | | 5/2001 | Gundel et al. ................ 29/458 |
| 6,302,932 B1 | | 10/2001 | Unger et al. ................... 55/306 |
| 6,316,684 B1 | * | 11/2001 | Pinnau et al. ................ 585/818 |
| 6,383,386 B1 | * | 5/2002 | Hying et al. ............ 210/500.25 |
| 6,486,240 B1 | | 11/2002 | Won et al. .................... 524/104 |
| 6,565,782 B1 | | 5/2003 | Wang et al. ................... 264/41 |
| 6,596,112 B1 | | 7/2003 | Ditter et al. ................. 156/182 |
| 6,605,140 B2 | | 8/2003 | Guiver et al. ..................... 96/4 |
| 6,605,218 B2 | | 8/2003 | Kozawa et al. ............. 210/500 |

(Continued)

*Primary Examiner*—Ana Fortuna
(74) *Attorney, Agent, or Firm*—Robert M. Trepp; David Aker

(57) ABSTRACT

A novel asymmetric filter membrane, and process for making is disclosed in several exemplary versions. The membrane structure is physically robust and suitable for use in a wide variety of applications. The support membrane is may be comprised of material such as a porous silicon or a silicon oxide, and the separation membrane may be comprised of material such as a polymer, zeolite film, or silicon oxide. The process relies on steps adapted from the microelectronics industry.

12 Claims, 2 Drawing Sheets

U.S. PATENT DOCUMENTS

| | | | |
|---|---|---|---|
| 6,783,832 B2 * | 8/2004 | Shintani et al. | 428/64.4 |
| 6,843,379 B2 * | 1/2005 | Hognabba et al. | 210/486 |
| 6,854,602 B2 * | 2/2005 | Oyama et al. | 210/490 |
| 6,930,034 B2 * | 8/2005 | Colburn et al. | 438/619 |
| 6,942,921 B2 * | 9/2005 | Rueckes et al. | 428/408 |
| 7,060,624 B2 * | 6/2006 | Andricacos et al. | 438/700 |
| 7,071,539 B2 * | 7/2006 | Nicholson et al. | 257/642 |
| 7,153,335 B2 * | 12/2006 | Siddiqui et al. | 51/307 |
| 7,169,885 B2 * | 1/2007 | Chung et al. | 528/480 |

* cited by examiner

POROUS SILICON COMPOSITE STRUCTURE AS LARGE FILTRATION ARRAY

BACKGROUND

Microfilters are used in separation processes in which solids, liquids or gasses are separated from fluid media. The separation can be on a molecular level or on a coarser level. The present invention relates to the use of a composite microfilter comprising a separation layer and a porous support layer. This type of configuration is known as asymmetric. Aspects of the present invention are conveniently adapted to the art of filtration from processes well established in the art of semiconductor processing.

A simple composite filter typically comprises a thin polymeric membrane separation layer undergirded by a support layer. The separation layer may include very small diameter pores or it may be dense, i.e. essentially opening-free, as in osmotic filtration by absorption and diffusion through a semipermeable membrane. The separation layer may be on the order of about 1-2 microns thick. A thin polymeric layer tends to favor increased permeability, but also tends to promote frailty of the filter. The support layer is often also a membrane, of the same or different composition as comprises the separation membrane, having a matrix of pores of larger diameter than those in the separation membrane, the pores extending therethrough to the supported separation membrane. A support layer is generally about 12 to about 125 microns thick, but is always much thicker than the separation layer.

There may be more than two membrane layers in a particular filter structure and as many types of material, as described in U.S. Pat. No. 6,596,112 B1 to Ditter et al., in which melt bonding of stacked materials, at a temperature as low as under 200° F. to above 396° F. is used to build a laminated multilayer structure. There also may be additional components within a filter chamber, such as that described in U.S. Pat. No. 6,302,932 B1 to Unger et al, in which a rigid frame of chemical and moisture-resistant metal or polymer can be added to reinforce the support of the separation layer.

As a fluid medium passes through the separation chamber, one or more of the materials within the fluid are separated by molecular or particle size or by chemical affinity for the separation layer, while the porous support membrane, having larger diameter pores than in the separation layer, offers little or no resistance to mass transfer and adds to the mechanical strength of the much thinner separation layer. Pore size distribution in the separation layer promotes selectivity in a filtration system which does not rely on osmosis. Pore size in an asymmetric membrane can be fabricated to be as small as about 0.01 micron, or even less, and as great as about 100 microns, or even greater, as required by the materials to be separated. Pore distribution may comprise as little as about 3% of the membrane or as much as about 80%.

Asymmetric membranes have been successful as commercial membrane filters, as they offer high selectivity through the separation layer and a high throughput of material through the supporting layer. Asymmetric membranes are found in a number of important fluid-fluid, gas-gas, solid-fluid, solid-gas and gas-fluid filtration processes, which may include ink filtration, semiconductor processing, air and water purification, water desalinization, environmental sampling, gas recovery from manufacturing processes, enrichment of specific gases in a mixture, pharmaceutical manufacture and manufacture of high purity chemicals, purification and testing in the food and beverage industries, blood filtration diagnostics and dialysis in the medical field, quick sample detection, and thin film chromatography.

The selection of materials for inclusion in the filter is highly solute- and solvent-dependent. Although commercial asymmetric membranes are generally fabricated from thermoplastics, such as polysulfone, because they are thermally robust and somewhat chemically resistant when compared to other polymers, a membrane need not be comprised solely of an organic material. Under conditions unfavorable to polymer use, it may be comprised of a mineral such as the carbon-containing or ceramic membranes described in U.S. Pat. No. 5,190,654 to Bauer. A membrane may comprise a porous metal layer, such as the metal coated with sintered particles described in U.S. Pat. No. 5,492,623 to Ishibe for use at temperatures up to about 400° C. in the filtration of process gas used in manufacturing semiconductors. U.S. Pat. No. 6,605,140 B2 to Guiver et al. refers to a polyimide-silica membrane.

While the present invention is configured in essentially smooth layers, a membrane may be more highly dimensional, fabricated into shapes in steps modeled on thin film etching, lithographic patterning and deposition practiced in the production of microelectronics, as described in U.S. Pat. No. 4,701,366 to Deckman et al. As described in the Deckman et al. patent, zeolite-like materials of controlled pore size between about 10 and about 10,000 Angstroms, but possibly as small as about 5 Angstroms, are fabricated as slots in shapes etched in a superlattice structure situated on a potentially removable substrate. In addition to zeolite, layers that are described as candidates for the superlattice structure include silicon nitride, amorphous silicon, amorphous germanium and amorphous silicon dioxide, deposited sequentially by evaporation and sputter deposition.

Permeability of a membrane may be improved by applying positive pressure on the separation side and/or by negative pressure on the support side. One approach to improving permeance of a porous alumina ceramic membrane is described in U.S. Pat. No. 5,782,959 to Yang et al. in which the alumina pores are provided with a catalytic palladium coating in order to facilitate hydrogen separation from gas streams. In another type of support membrane, the Immobilized Liquid Membrane, described in U.S. Pat. No. 5,100,555 to Matson, permeability is influenced by the depositing into the pores of the membrane by capillary action any of a number of identified solvents, some of which have been approved by the United States Food and Drug Administration for use in food and medical applications.

A membrane may be or be rendered, hydrophobic, hydrophilic or oleophobic, depending on the intended application and the nature of the materials to be separated. Commercial organic asymmetric membranes are generally constructed from thermoplastics. However, problems associated with the natural hydrophobicity of thermoplastics severely limit the use of these materials in many water-based applications. As a consequence, the surface, and in some cases the interior, of these membranes must be rendered hydrophilic through the addition of a wetting agent, such as a dilute detergent solution, and/or by chemical modification of the membrane structure prior to use in aqueous separation. Issues frequently encountered in applying these modifications include lack of permanence of the modification, fouling of the filtered material by the impermanent wetting agent or chemical, reduction in porosity of the membrane, and the presence of unmodified areas in the porous structure.

Some materials used to modify the surface charge of a membrane include polyvinylpyrrolidone, polyethylene glycol, polyvinyl alcohol, carboxymethyl cellulose or mixtures thereof. As described in U.S. Pat. No. 5,032,149 to Hayes, some materials applied on particular membrane surfaces to improve selectivity either in gas-gas or liquid-liquid separations may include a fluorinated amphophilic compound, a Bronsted-Lowry acid or base or a dilute cationic, anionic or nonionic surfactant solution.

Other issues that plague long-term use of treated membranes include increased risk of embrittlement, shrinkage, and pinhole defects. The membrane industry incurs an inordinate expense in developing alternate membrane materials and broadening the types of membrane surface chemistries. In one example, U.S. Pat. No. 6,110,249 to Medcalf et al., is described a microporous e-polytetrafluoroethylene membrane for removing particles from gas, the membrane and a support layer being melt bonded in order to reduce pore blockage between the layers, thereby reducing the incidence of tearing and cracking attributed to partial pore nonalignment. Another approach includes sealing defects with a swelling agent or applying a thin overcoat of dense polymer. In U.S. Pat. No. 4,775,474 to Chau et al. a glassy polymer, normally dense, is strengthened by crazing on its major surface intended for contact with the permeate stream subsequent to controlled crosslinking to a limited surface depth.

Solutions to membrane problems may introduce limitations of their own, such as altering the permeation and selectivity, incomplete coverage or delamination of the plug or overcoat with use, and heat degradation. Notably, silicon, a membrane material in the present invention, is naturally and permanently hydrophilic. Silicon is not adversely affected by drying, and its natural hydrophilicity does not elute.

The art, both prior and current, describes a number of complex multistep processes for fabrication of filters for particular separations and in particular applications. U.S. Pat. No. 6,565,782 B1 and 6,045,899 to Wang et al. review in the art the formation of asymmetric, hydrophilic microfiltration membranes fabricated using a typical sol-gel phase inversion process, involving a number of steps to obtain the gel, which is the polymer matrix. The Wang patents also review the fabrication of polymeric membranes by casting from homogenous solutions of polymer, citing that the resulting membranes are not usually as asymmetric as those cast from an inversion process and may even have reverse asymmetry. U.S. Pat. No. 6,486,240 B1 to Won et al. describes issues involved in the fabrication of membranes by gelation, and describes an alternative phase separation gelation. Another set of processes for fabricating polymeric asymmetric membranes, for separation of certain liquids and of certain gases, is found in U.S. Pat. No. 4,873,037 to Chau et al. The Chau et al. patent describes several modes of fabrication and is also useful for its description of other fabrication methods for asymmetric membranes in the art, as well as listing a number of uses.

Despite the work reported in the field of membrane development, the need remains for the unique combination of materials and processes set forth in the several embodiments of the present invention, in which robust versatile membranes are provided relatively simply and cleanly, using steps adapted from the microelectronics art.

SUMMARY OF THE INVENTION

The present invention is directed to a membrane microfilter having a thin separation layer and a porous silicon substructure, and methods for making the same. The invention is set forth in several embodiments. The present invention offers several important advantages over commercial polymeric membranes. Silicon offers a wide range of materials and surface chemistries for compatibility with a wide range of filtration systems. The 1410° C. melting point of silicon implies that it is a refractory material suitable for higher temperature filtrations; it can also withstand low temperatures. Silicon is relatively inert to chemical attack, except by halogens, alkali solutions, HF and $HNO_3$. Silicon wafers are easy to handle and do not easily tear, crack or suffer other insults during normal handling and use, which significantly reduces or eliminates down time due to repair and reduces the opportunity to introduce fouling during repair. Silicon wafers are not expensive, and are commercially available in 5 inch, 6 inch, 8 inch and 12 inch diameter sizes which can be combined to create large filtration arrays for optimal throughput. Silicon is a suitable support membrane for a polymer that is, or can be modified to be, positively photoactive, or a polymer or inorganic that can be dry etched through a mask.

A support membrane comprised of other semiconductors such as silicon dioxide, silicon nitride or germanium shares many of the advantages of silicon, including the advantage of handling experience in the microelectronics industry.

The number of steps in the fabrication of the membrane of the present invention are minimal and are less complex than those known in the art for fabricating membranes, such as phase inversion and phase separation processes. The process of the invention relies on steps commonly practiced using the extant semiconductor processes, clean room facilities and semiconductor tooling used in FEOL/BEOL (Front End of Line/Back End of Line) microelectronics technologies, wherein obtaining features in the submicron range is routine. Fouling is a major concern in the filter art, including fouling that originates in the filter itself. With the simpler, clean, processes and fewer, but more robust materials and process steps of the present invention, cleanliness is favored as fabricated and as cleaned for reuse. Alternatively, the filter is cheap enough to discard after use. It can be implanted in the body. The present invention, which incorporates a lithographic process, can provide a higher packing density than polymer-based structures fabricated by phase inversion or phase separation processes.

DETAILED DESCRIPTION OF THE INVENTION

Figure 1:
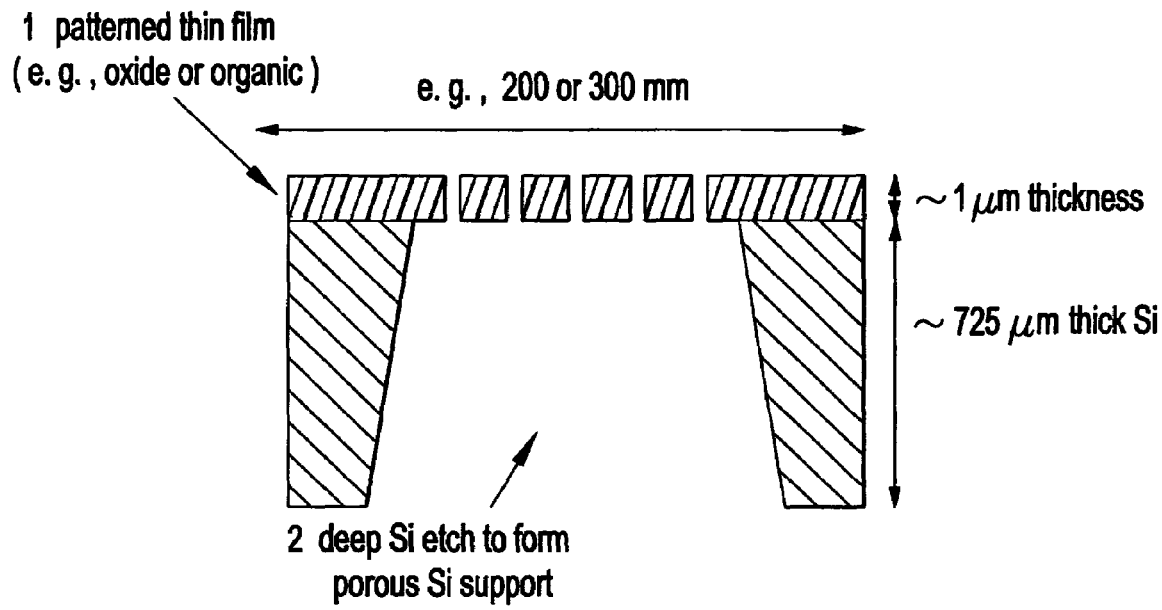
FIG. 1 is a schematic representation of a porous separation layer disposed atop a porous silicon support membrane.

The filter membrane structure shown in FIG. 1 uses a thin separation layer 1, which can be an inorganic, for example $SiO_2$, or an organic material, that is lithographically patterned by a method known in the art to form a channel-pore structure. A channel-pore structure permits a size-selective process in which molecules larger than the diameter of the channel-pores are retained, while the smaller molecules elute. The thin separation layer 1 is deposited on a bulk crystalline silicon support membrane 2. Spin glass, such as siloxanes, silsesquioxanes, N-silsesquioxanes, and polycabosilanes also can be used to form a separation layer, as can polyimide, polysulfone, and polyethersulfone.

The silicon material comprises a wafer thickness which, as manufactured, is between about 725 and about 750 μm thick. Thin film separation layer 1 can be deposited by a number of methods known to those skilled in the art, such as chemical vapor deposition (CVD), plasma-enhanced CVD, or spin-on. In an exemplary embodiment, the separation layer comprises a silicon oxide formed by a plasma-enhanced CVD process with a tetraethoxysilane (TEOS) source in a process known in the art. Next, a photoresist layer is deposited upon the oxide layer and cured, using conventional photoresist processing techniques. The photoresist layer is then patterned, preferably with an optical aligner and a photomask, exposed and developed to create openings in the photoresist layer. Then, using the resist layer as a masking layer, the pattern is transferred into the underlying oxide by a dry etching method using a LAM4520XL etch chamber and $C_4F_8CO/Ar/O_2$ chemistry. Then, the resist is stripped from the oxide layer using conventional photoresist processing techniques, such as a solvent strip or an $O_2$ dry etch (ashing) method. Notably, the present invention is not limited to vias or through-holes but includes other shaped structures apparent to those skilled in the art such as lines, squares, and octagons.

The backside of the wafer to be fabricated into a silicon support membrane is lithographically patterned using a similar method. A deep reactive ion etch is used to transfer the features laterally-defined by the masking layer into the bulk substrate. A suitable deep etch method is described in co-pending patent application serial number 10/639,989, now U.S. Pat. No. 7,060,624, which is commonly assigned with the present invention and is incorporated herein by reference.

In the presently preferred embodiment, support membrane 2 comprises silicon, so that pattern transfer is accomplished using silicon etching by fluorine radicals generated in a plasma, as is known in the art. Such deep silicon structures can be accomplished using commercially-available, deep reactive ion etch (RIE) systems such as the A601E, available from Alcatel. The deep RIE dry etching method uses time-multiplexed deep etching (TMDE), a variation of sidewall passivation, wherein etching and deposition cycles are performed sequentially. During the deposition step, sidewalls formed within support membrane 2 are passivated by a polymer deposited from a plasma formed from the deposition precursor. During the subsequent etching cycle, both the polymer and the silicon are preferentially etched from the bottom of the membrane trench by ion bombardment. By switching between etching and deposition cycles, deep anisotropic structures having vertical sidewalls can be realized with very high etching rates in silicon membranes. A buried or backside oxide or metal layer may be used as a stopping layer for the deep Si etch.

The resulting structure shown in FIG. 1 can be used in filtration applications in which macromolecules, such as proteins, are separated from fluids, such as plasma, water, milk or the like, based on size, by the porous oxide layer. To assure a high selectivity and throughput, a preferred embodiment uses a very thin oxide layer, less than about 1 μm thick, a feature size selective to the size of the permeate, and a high pattern density. The exact pattern density, or loading, which can be established by mask selection, is generally between about 0.5% and about 50%. However, it is possible to increase the loading above 50%, with the tradeoff of a decrease in etch rate. The average diameter of deep vias in the underlying silicon support structure can be made larger than those in the separation layer, so that as the silicon substructure 2 acts as a mechanical support for the oxide skin layer 1, it also offers little to no resistance to mass transfer.

Figure 2:
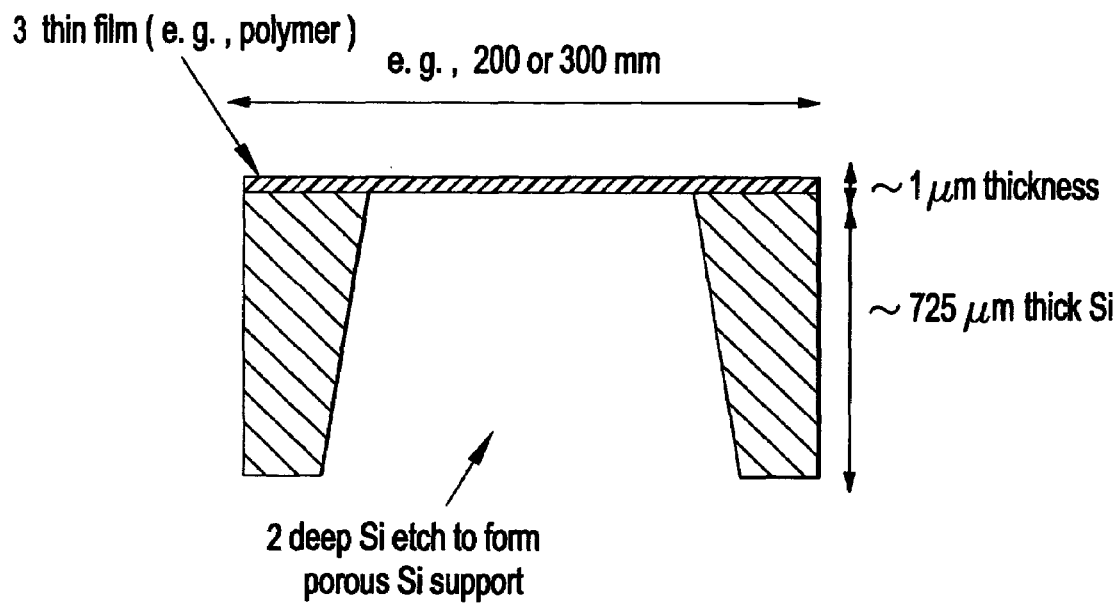
FIG. 2 is a schematic representation of a dense polymer separation layer disposed atop a porous silicon support membrane.
Figure 3:
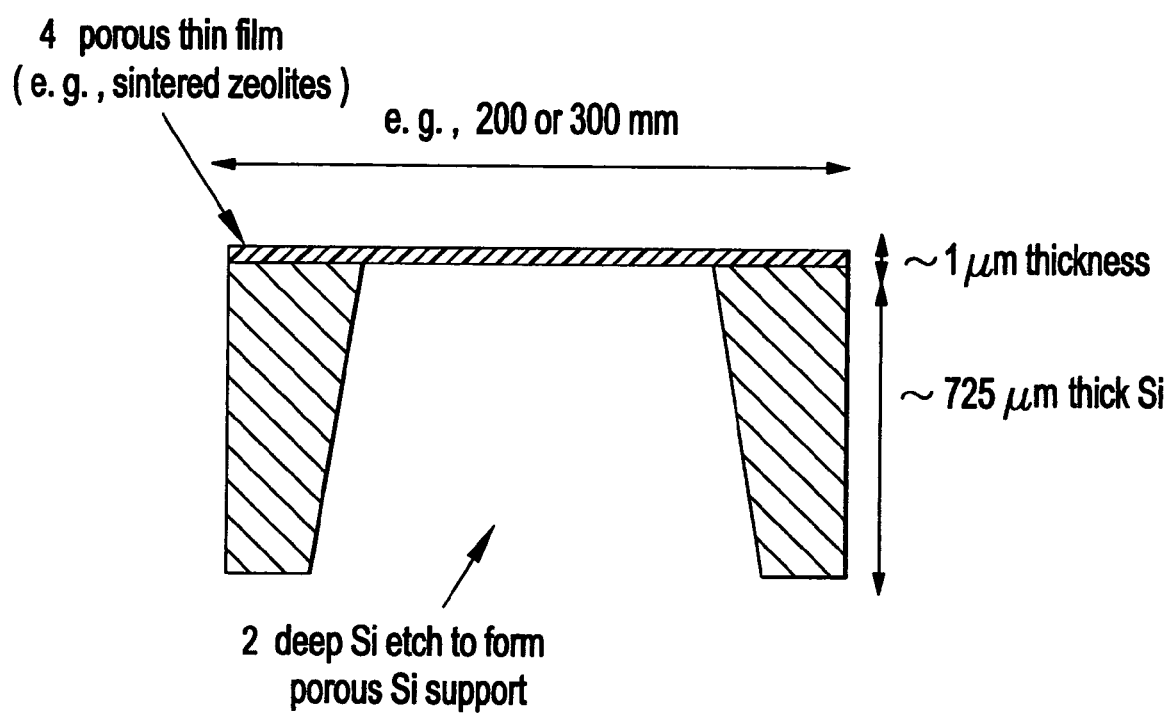
FIG. 3 is a schematic representation of a porous inorganic separation layer disposed atop a porous silicon support membrane.

The embodiments shown in FIGS. 2-3 use a similar method to prepare the underlying silicon support for the separation layer. However, in the embodiments shown in FIGS. 2-3, the separation layers 3 and 4, respectively, need not be lithograghically patterned to produce a porous structure. The structure shown in FIG. 2 uses a thin organic film, such as a polymer, as separation layer 3 to separate molecules based on chemical affinity or permeability, supported by porous silicon support structure 2. In this embodiment, the thin film can be deposited by any of a number of methods known to those skilled in the art, such as chemical vapor deposition, plasma-enhanced chemical vapor deposition, and spin on. Hence, small molecules such as $N_2$ and $O_2$ can be separated based on their respective rates of permeation through the nonporous skin layer. Alternatively, molecules that have a chemical affinity for the particular organic thin film can adsorb and diffuse through the separation layer. In a preferred embodiment, a material highly permeable to certain organic molecules, trade named SilK™ (Trademark from Dow Chemical Company), a crosslinked aromatic thermoset which is highly permeable to short chain aliphatic compounds and can separate organic contaminants from waste water, is used. Spin glass, such as siloxanes, silsesquioxanes, N-silsesquioxanes, and polycabosilanes also can be used to form a separation layer, as can polyimide, polysulfone, and polyethersulfone. To assure high throughput, the separation layer should be very thin, i.e. under one micron.

The structure in FIG. 3 uses for the separation layer 4 a thin layer, about 1 micron, of molecular-cage compounds known as zeolites to separate small molecules based on size. The thin film can be deposited by spin-on. Small molecules are trapped within the molecular-cage structure, permitting larger molecules to pass. If necessary, pretreatment of the surface underlying the zeolite layer can be used to improve adhesion.

Although the figures show only one membrane structure, an indefinite number of individual membrane structures may be fabricated simultaneously across a standard diameter silicon wafer in fabricating a large filtration array microfilter for optimal throughput. The membrane structure can also be used as a prefilter, or in a chain of filters, each unit of the chain providing an increased level of purity.

We claim:

1. A composite asymmetric microfilter structure comprising at least one separation membrane, the at least one separation membrane comprising a spin-on glass selected from the group consisting of siloxanes, silsesquioxanes, N-silsesquioxanes, and polycabosilanes, atop a support membrane, the support membrane being selected from the group consisting of silicon, silicon dioxide, silicon nitride, germanium and any combination thereof.

2. An array comprising a plurality of the composite microfilter stucture recited in claim 1.

3. The structure recited in claim 1, wherein the support membrane comprises a porous silicon wafer.

4. The structure recited in claim 1, wherein the separation membrane is about 1 μm thick.

5. The structure recited in claim 1, wherein the separation membrane is lithographically patterned with a plurality of micropores therethrough.

6. The structure recited in claim 5, wherein the support membrane is provided with a plurality of micropores therethrough having broader average diameter than the plurality of micropores of the separation membrane.

7. A composite asymmetric microfilter structure comprising at least one separation membrane, the at least one separation membrane comprising a spin-on glass selected from the group consisting of siloxanes, silsesquioxanes, N-silsesquioxanes, and polycabosilanes, atop a support membrane of silicon.

8. An array comprising a plurality of the composite microfilter stucture recited in claim 7.

9. The structure recited in claim 7, wherein the support membrane comprises a porous silicon wafer.

10. The structure recited in claim 7, wherein the separation membrane is about 1 μm thick.

11. The structure recited in claim 7, wherein the separation membrane is lithographically patterned with a plurality of micropores therethrough.

12. The structure recited in claim 7, wherein the support membrane is provided with a plurality of micropores therethrough having broader average diameter than the plurality of micropores of the separation membrane.

* * * * *